June 25, 1957 E. F. CUTLER 2,797,009
VEHICLE MOUNTED TILTING HOIST
Filed Feb. 24, 1955 3 Sheets-Sheet 1
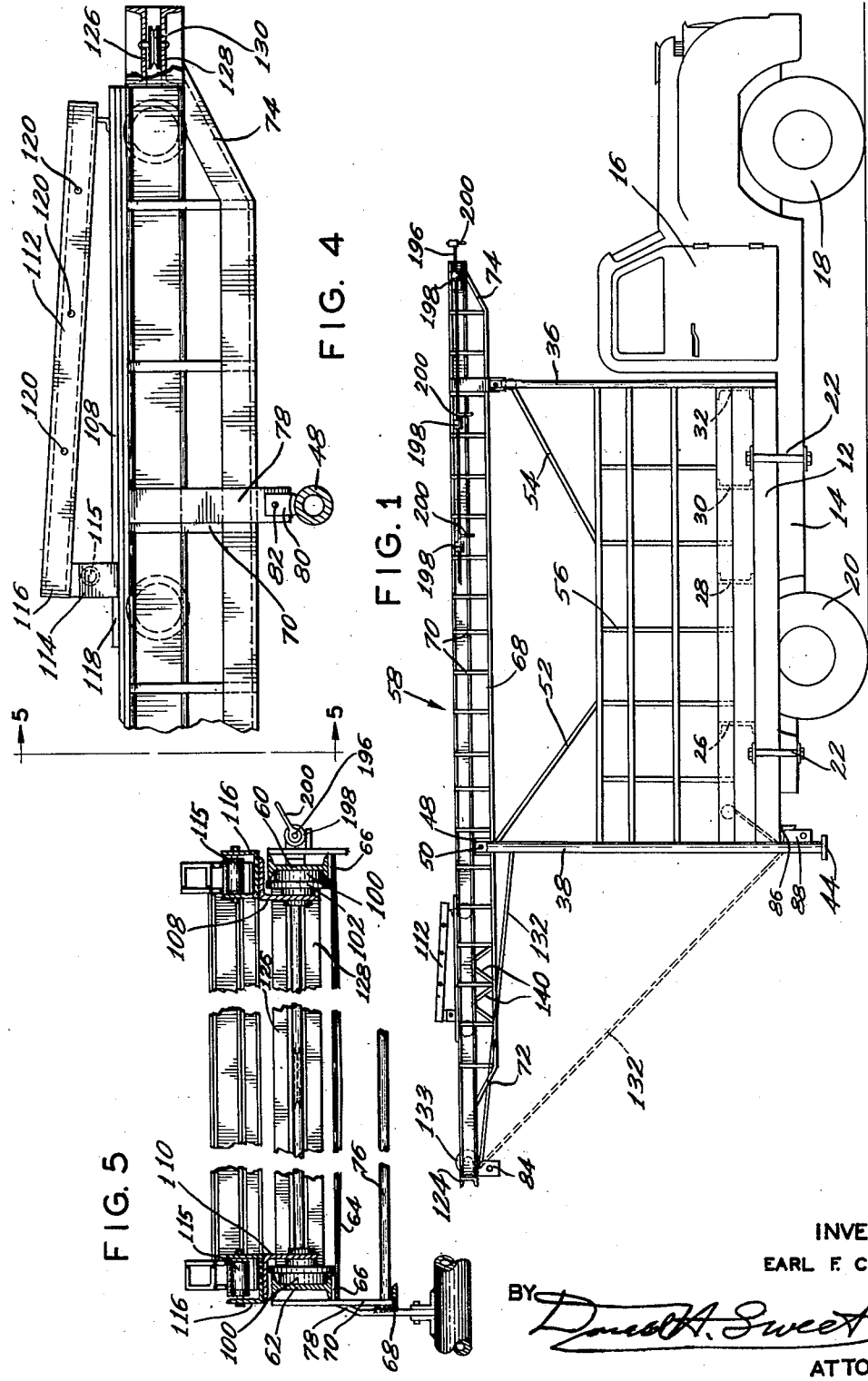
INVENTOR
EARL F. CUTLER
BY
ATTORNEY June 25, 1957  E. F. CUTLER  2,797,009
VEHICLE MOUNTED TILTING HOIST
Filed Feb. 24, 1955  3 Sheets-Sheet 2

INVENTOR
EARL F. CUTLER
BY
ATTORNEY

June 25, 1957 E. F. CUTLER 2,797,009
VEHICLE MOUNTED TILTING HOIST
Filed Feb. 24, 1955 3 Sheets-Sheet 3

INVENTOR
EARL F. CUTLER
BY *Donald H. Sweet*
ATTORNEY

United States Patent Office 2,797,009
Patented June 25, 1957

2,797,009
VEHICLE MOUNTED TILTING HOIST
Earl F. Cutler, Palos Park, Ill.

Application February 24, 1955, Serial No. 490,211

18 Claims. (Cl. 214—672)

My invention relates to hoist equipment of a type commonly employed in connection with the erection and upkeep of building structures, but available for a variety of more or less analogous uses, such as removal of personnel or merchandise from the second floor of a burning building, fruit-picking, and so forth.

In the accompanying drawings:

Figure 1 is a side elevation of a unit according to the invention mounted on a conventional motor truck;

Figure 4 is an enlarged detail of the upper end of the boom;

Figure 5 is a section as on line 5—5 of Figure 4;

Figure 6:
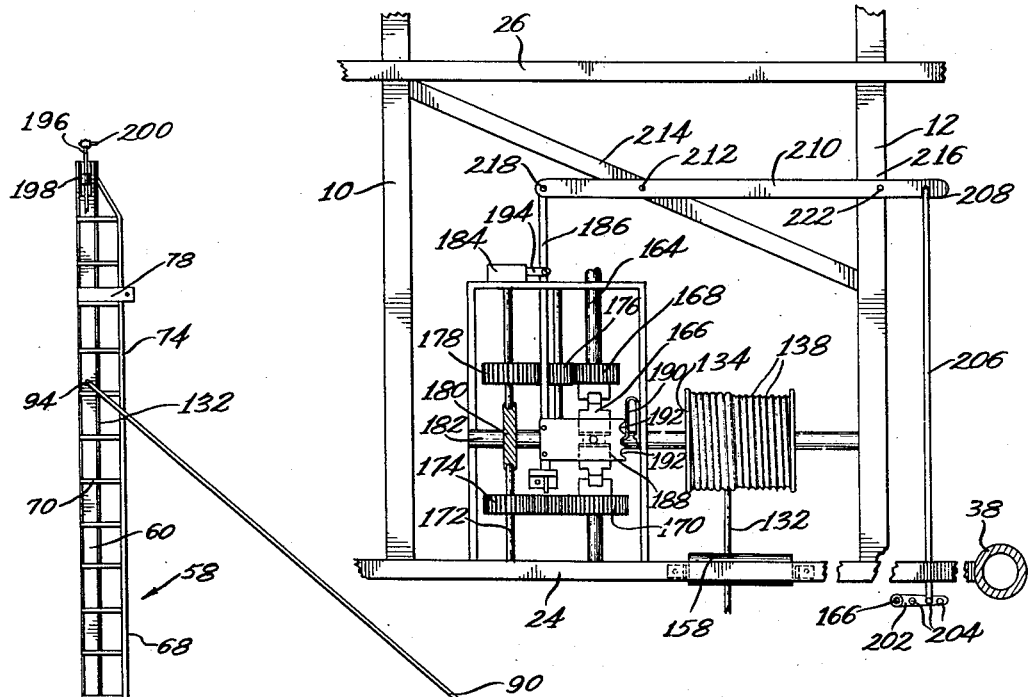
Figure 6 is a plan view looking down from above on the uncovered winch and transmission.

In the embodiment selected to illustrate the invention, the main frame comprises longitudinal I beams 10 and 12 transversely spaced to rest on the longitudinal beams 14 of a conventional motor vehicle having a cab 16, front wheels 18, and rear wheels 20. The frame may be suitably fastened to the chassis, as by clamping bolts 22, and removal of these bolts permits the entire unit to be lifted off the chassis for storage or repair or transfer to another chassis.

Figure 2:
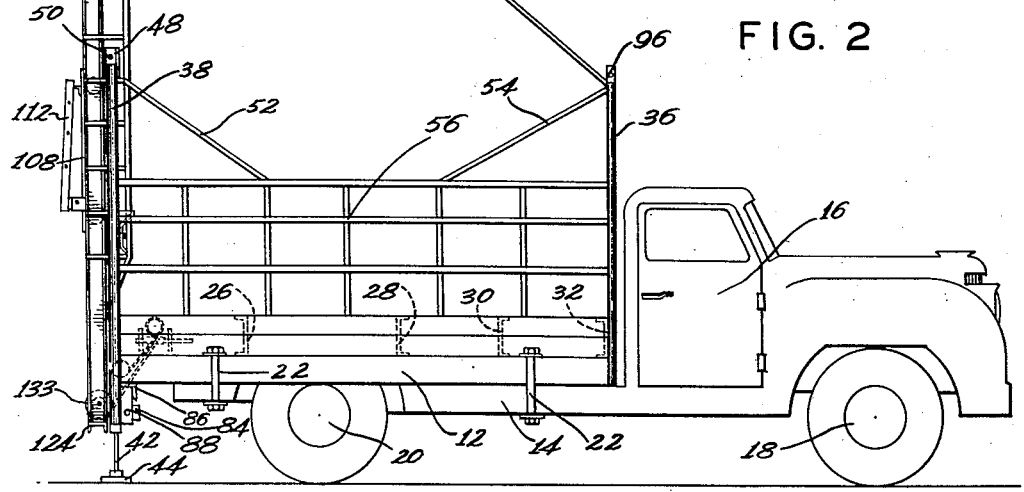
Figure 2 is a side elevation of the same structure with the boom raised.
Figure 7:
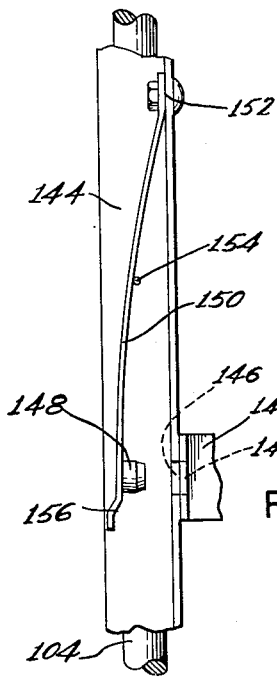
Figure 7 is a detail of the carriage fastening means.
Figure 8:
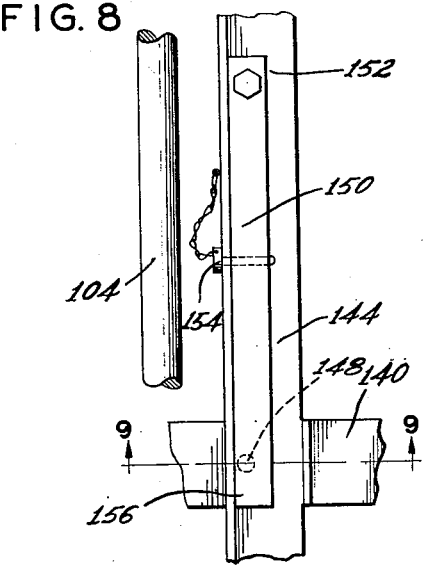
Figure 8 is a view of the same detail looked at from the right, as seen in Figure 7.
Figure 9:
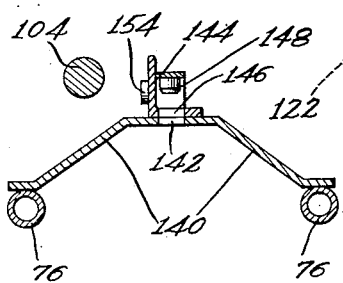
Figure 9 is a detail section on line 9—9 of Figure 8.

Five transverse channels 24, 26, 28, 30, and 32 rest on the beams 10 and 12 and are permanently fastened thereto to form a unitary rigid frame carrying a flooring 34 covering the entire rectangular area defined by the channels 24. Front corner pillars 36 are rigidly assembled with the frame and extend down only to the level of the lower flanges of the beams 10 and 12. Rear corner pillars 38 and 40 are rigidly assembled at the rear corners of the frame and include downwardly extending portions housing the operating screws 42 of adjustable jacks having ground engaging feet 44. These are shown in contact with the ground surface in Figure 2. When the vehicle is moving from place to place, they can be lifted up to bring the feet 44 up to the bottoms of the pillars 38 and 40 and provide adequate road clearance, as in Figure 1.

The upper ends of all four pillars are connected transversely by a rear tubular cross-piece 46 and a front tubular cross-piece 48. The ends of the rear cross-piece 46 are detachably assembled with the pillars, as by welding channels 48 to the upper ends of the pillars, and providing the tube 46 with pintles in the nature of bolts 50. The upper ends of the pillars are also braced longitudinally by diagonal struts 52 for the pillars 38 and 40 and diagonal struts 54 for the pillars 36. In the common form of body equipped with strong side panels 56, the struts may run to the side panels.

The main boom is indicated as a whole by the reference character 58 and comprises spaced I beams 60 and 62 transversely braced by a series of diagonal tension members 64 arranged in a continuous series of X-shaped trusses. The ends of the diagonal braces 64 are affixed to the adjacent flanges of the beams 60 and 62, but filler blocks 66 are interposed to offset the braces far enough to clear the flanges of the carriage wheels to be described hereinafter. Each of the beams 60 and 62 is reinforced by a truss construction. The primary truss member is an angle 68 extending longitudinally parallel to its I beam and spaced about four or six inches away from it. A series of straps 70 twelve inches apart is provided. Each strap 70 is welded to the edges of the flanges of its beam and to the leg of the angle 68 lying in the same plane. At the lower end, the angle 68 is turned up diagonally as indicated at 72 and at the upper end as at 74. In register with the straps 70 I connect the opposite angles with tubular crosspieces 76, which function to increase the rigidity of the structure and also to provide convenient ladder rungs by means of which a workman may ascend the vertical boom. The rungs 76 are offset far enough from the beams 60 and 62 and the carriage slidable along those beams, so that there is no danger that the moving carriage will strike the toes of a workman standing on the ladder.

Means are provided for fastening the boom 58 in horizontal position for transportation from place to place and in vertical position for use as a hoist or working ladder.

Near the upper end, straps 78 materially heavier than the straps 70 are affixed to the channels 60 and 62 and to the truss angles 68, and project beyond the same. The front cross-piece 48 carries brackets having upwardly projecting lugs 80 positioned to lie beside the ends of the straps 78 and apertured to receive a fastening bolt 82.

When the boom is vertical, straps 84 on the channels 60 and 62 project forwardly under the transverse channel 86 which braces the beams 10 and 12 and the pillars 40 and 38. A lug 88 projecting downwardly from the channel 86 has an aperture to register with an aperture in the strap 84 and receive a fastening bolt.

However, the working load on the boom when the hoist is in operation is not carried by this fastening means. Long side braces 90 and 92 are provided. The side brace 90 is pivoted at 94 to the channel 60 near the upper end of the channel, and the side brace 92 is pivoted to the channel 62 at the same height. When the boom is vertical these channels are swung forward to the position of Figure 2 and their lower ends are fastened at 96 to the upper ends of the pillars 36. This provides a connection of much greater strength and of relatively great rigidity compared with the connection at the bottom of the boom, and the heavy working loads imposed by operation of the hoist will be carried in tension in the braces 90 and 92 rather than as a bending load in the beams 60 and 62 about their pivotal connection 63 (see Figure 3) with the cross-piece 46.

To lower the boom into closed position, the operator merely disconnects the braces 90 and 92 at their lower ends, and they swing back parallel to the boom and lie close against the sides of the boom. To permit them to swing in parallel to the beams 60 and 62, it is only necessary to make the pivotal connection at 94 with the hole a little loose on the bolt.

The hoist proper comprises a carriage having four rectangularly spaced wheels 100, each wheel having its body portion riding between the flanges of a co-operating beam 60 or 62, and a circular flange 102 of slightly larger diameter to ride against the edge of the beam flanges and limit transverse movement. The wheels are mounted on a lower solid axle 104 and an upper solid axle 106, and these axles are mounted in a rectangular frame including an angle 108 nested around the beam 60 and an angle 110 nested around the beam 62.

The carriage carries a platform or shelf 112 hinged at 115 in brackets 114 welded to the angles 108 and 110. The shelf is formed with a heel 116 positioned to swing down against a pillow indicated at 118 in Figure 4 and constituting the lower end of the outwardly facing flange of the angle 108. The frame of the shelf 112 is apertured at 120 to receive conventional fastening bolts for a platform, or any other suitable supporting a structure, which may extend as indicated in dotted lines at 122 in Figure 3.

It will be obvious that the carriage may move down until the lower ends of the angles 108 and 110 strike the bottom cross-piece 124, and up until the upper ends of the same angles strike the sides of a cross-piece at the top comprising channels 126 and 128 arranged back to back (see Figure 4), which channels carry a pivoted sheave 130 between them.

Means are provided for delivering power to the carriage to move it up and down on the vertical boom. I have illustrated a single flexible wire cable 132 attached at one end to the carriage at 131 and extending from the carriage up over the sheave 130 and back to the other end of the boom and over a traveling sheave 133, and from the traveling sheave back to the drum 134 of a power-driven winch. The sheave 133 is freely slidable axially along a transverse shaft 135 and protected from accidental wedging contact with other parts by a floating shield 136, so that the cable 132 can keep itself aligned with the receiving grooves 138 in the drum 134.

Means are provided for anchoring the carriage so that the winch can pull on the cable to raise the boom to operative position and lower it to inoperative position. Between adjacent ladder rungs 76, I provide a plurality of brackets 140 of a shallow U-shape, with an anchor hole at 142. The angle cross-piece 144 of the carriage has a hole 146 positioned to move into alignment with any one of the holes 142, and to receive a locking bolt, such as 148. The bolt illustrated is on the end of a leaf spring 150 anchored to the cross-piece 144 at 152 and tending to hold the bolt in operative locking position. When the carriage is in use for hoisting, the bolt is held in the inoperative position shown by the pin 154. To lock the carriage, remove the pin 154 and let the carriage run slowly past the hole 142. The end of the bolt 148 will ride up the inclined sides of the bracket 140 and snap into the hole 142, and the operator is ready for the next operation, which would normally be lowering the boom. When the carriage is locked, it may be unlocked by grasping the hook 156 at the end of the spring 150, and lifting the spring into the position shown in the drawings, and slipping the pin 154 into place. This is only done after the boom is vertical and has been fastened in vertical position, at which time the parts are readily accessible to release the carriage for hoisting use.

To lower the boom the carriage is first locked in position and then the connecting bolt for the lug 88 is removed, and the ends of the braces 90 and 92 are disconnected. The entire boom is now free to pivot around the cross-piece 46, but its center of gravity is a little bit above and a little behind the pivotal point, so that when the parts are disconnected, there is no tendency for the boom to fall forward prematurely. Instead, after all the parts are disconnected, the operator pays out about two feet of cable from the winch drum 134 and then takes hold of the bottom of the boom manually and has to pull back with a fairly strong force of from forty to one hundred pounds to swing the boom to a position tilted forward about fifteen degrees. This brings the center of gravity of the boom forward, a little bit in front of the cross-piece 46, and the boom presses gently against the cable while the workman operates the winch to let the cable 132 continue to pay out until the boom position of Figure 1 is reached.

After the boom has swung about half way down to the position of Figure 1, the sheave 133 has moved up so far that the cable 132 would rub against the lower edge of the rear cross-piece 24. I have illustrated an idler roll 158 mounted on the lower edge of the cross boom 24 to avoid undesirable kinking of the cable.

After the boom has been lowered to the position of Figure 1, the cable will run in the dotted line position 132 from the roll 158 to the sheave 133. Because the cable in that position might get in the way of other vehicles crossing close behind the truck, I provide a holding hook 160 on the upper end of the pillar 38 and another holding hook 162 on the same pillar at about the floor level. After the boom is fastened in the position of Figure 1, the operator merely pays out additional cable and positions the cable manually in the full line position of Figure 1, where it runs forward to the pillar 38 close up under the boom and then down beside the pillar out of the way.

In Figure 6 I have indicated a suitable transmission for actuating the drum 134. The power receiving shaft 164 rotates the splined clutch member 166 which is axially movable into driving engagement with the low speed pinion 168 for taking in the cable, or the high speed gear 170 for paying it out. The high speed gear drives the worm shaft 172 in one direction by means of companion gear 174, and the low speed pinion 168 drives the intermediate reversing pinion 176 which drives the pinion 178 on the worm shaft 172. The worm wheel 180 is on the same transverse shaft 182 with the drum 134.

The worm wheel 180 may be of such pitch that the transmission is irreversible, but I prefer to safeguard the parts against accidental movement by means of an automatic holding brake 184. Control is by means of the longitudinal rod 186, rigid with the shifting plate 188 and movable forward and back from the neutral position shown. Suitable spring means, such as the leaf spring 190, with its end entering in one of three notches 192 in the adjacent edge of the plate 188, assures movement of the parts completely into each of the three predetermined positions. The brake 184 is operative in the position of Figure 6, but its actuating arm 194 is connected to the control rod 186 and displacement of it in either direction relieves the brake whenever the clutch 166 is moved into either driving position.

The details of the transmission illustrated, per se, form no part of my present invention and as automatic brakes such as the brake 184 are well known in the art, the description has not been encumbered with the details thereof.

It is desirable for the user to be able to stand on the ground at the rear, or on the platform 122, while the platform moves from the bottom to the top of the boom, and be able to have instant control of the operation of the winch wherever he is. I have illustrated a vertical control rod 196 journaled in spaced bearings 198 close beside the beam 60 and provided at frequent intervals with radial projecting handle members 200, by means of which it may be rotated around its vertical axis. Near the bottom it carries a radially projecting crank member 202 best illustrated in Figure 6, which has a plurality of radially spaced holes 204. The detachable pitman 206 may be laid in place with its rear end projecting down through one of the holes 204, and its front end at 208 projecting down through a hole in the end of the transfer lever 210. The transfer lever 210 has a fixed pivot at 212 on a diagonal cross brace 214 in the frame. Its right end rests on top of the beam 12 at 216, and its left end is connected at 218 to the front end of the control rod 186.

Figure 3:
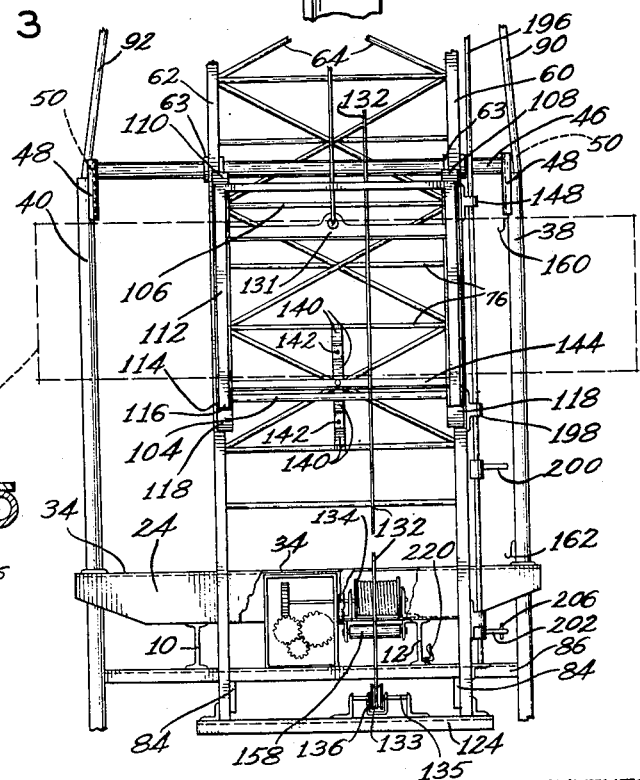
Figure 3 is a rear elevation of the lower portion of the raised boom and associated parts.

When the equipment is to be arranged in the position of Figure 1 for travel, it is necessary to lift the pitman 206 out of place and store it in any convenient location. A spring clip 220 is illustrated in Figure 3 for holding it against the web of the longitudinal beam 12 where it is readily accessible when needed. I also provide a hole 222 in the transfer lever 210. In the position of Figure 6, this hole may move into register with a co-operating hole in the flange of the beam 12, so that a bolt can be dropped in to lock the winch parts against accidental operation, when the equipment is arranged as in Figure 1 and is traveling along the road.

Others may readily adapt the invention for use under various conditions of service, by employing one or more of the novel features disclosed or equivalents thereof. It will be obvious that the owner of a fleet of trucks can not only transfer the entire unit from one truck chassis to another, but that the boom 58 and cross-piece 46 may be disconnected from the pillars 38 and 40 and quickly replaced with another boom of different proportions.

The boom illustrated will carry the shelf 112 down to within about ten inches of ground level, so that a loaded wheel barrow can be wheeled up an inclined plank onto the shelf. Then the barrow and the man manipulating it can be hoisted to any desired level and be rolled off the shelf onto a roof or the like. The boom illustrated is also offset to one side of the center line of the body. The shelf and its platform can be stopped at the level of the floor 34, and building materials stacked on the floor transferred to the shelf with a minimum of effort.

As at present advised with respect to the apparent scope of my invention, I desire to claim the following subject matter:

1. A mobile hoist unit, comprising, in combination: a conventional motor vehicle chassis; a body on said chassis; said body being open at its rear end; a boom pivoted on a transverse axis, and movable to vertical position adjacent to the rear end of said body, or into a horizontal position overlying said body; the transverse width of said boom being approximately half of the transverse width of the rear opening in said body; whereby, when said boom is in vertical position, a free space remains beside said boom at the rear end of said body for access to said body and egress of personnel or of materials loaded in said body.

2. A mobile hoist unit according to claim 1, in which said boom is offset laterally from the fore and aft central plane of said body, leaving a relatively large free space on one side and a relatively small free space on the other side.

3. A mobile hoist unit according to claim 2, in combination with a carriage on said boom; said carriage being longitudinally slidable on said boom, when vertical, from the top of said boom down to near the ground level; said carriage including a laterally extending portion extending across said free space; and hoist means for lifting and lowering said carriage; whereby, said carriage is available to receive loads close to the ground level and lift them to body level for loading or unloading said body, and to lift loads from ground level or body level to the top of said boom.

4. A mobile hoist comprising, in combination: a conventional motor vehicle chassis; a body on said chassis; a rigid boom on said body; said boom being pivoted on a transverse axis above said body approximately in the transverse plane of the rear end of said body; said boom having a short arm adapted to extend horizontally rearwards from said axis or vertically downwards below the level of said body and close to the ground level; said boom having a long arm extending vertically up when said short arm extends down and horizontally forward when said short arm extends rearwardly; a carriage longitudinally slidable on said boom; a sheave at the end of said long arm; a sheave near the end of said short arm; a body sheave carried by said body adjacent the position of said short arm sheave when said boom is vertical; power means for taking in or paying out a cable running over said body sheave; and a cable running from said carriage over the long arm sheave, then to and over the short arm sheave, then to and over said body sheave, and then to said power means.

5. A hoist according to claim 4, in combination with means for limiting the movement of said carriage on said boom; whereby, a purchase is afforded to permit said carriage cable to pull said boom from horizontal to vertical position.

6. A hoist according to claim 5, in which said limiting means fastens said carriage on the short arm of said boom spaced from said transverse axis.

7. A hoist according to claim 6, in combination with a manual control element extending longitudinally in parallelism with said boom and accessible to a workman on said carriage at any position of said carriage; and connections from said control element to said winch for operating said winch in either direction.

8. A mobile hoist unit comprising, in combination: conventional ground-supported running gear; a frame; a boom pivoted on a transverse axis near the top and rear of said frame; said boom when in vertical, operative position, having a short arm extending below its pivot and below said frame close to the ground level, and a long arm extending above said pivot; said boom being rotatable through approximately one-quarter revolution about its pivot, into an inactive position with its long arm extending forward over said frame and its short arm extending rearward behind said frame; a winch carried by said frame; manually controllable power connections for operating said winch in either direction; a flexible cable actuated by said winch; a first guide means for said cable causing it to issue from the rear end of said frame below said boom pivot near the lower end of the boom; said cable extending from said first guide means to the short arm of said boom at about the level of said first guide means, for pulling on said boom to swing it from inactive to operative position; and means for holding said boom in either position.

9. A unit according to claim 8 in combination with a hoist carriage slidable along said boom and positioned to the rear of said boom when said boom is in vertical, operative position.

10. A unit according to claim 9 in which said boom comprises spaced parallel structural beams, and a reinforcing truss structure located on the sides of each beam remote from said carriage.

11. A unit according to claim 10 in combination with uniformly spaced transverse cross-pieces interconnecting said truss structures; said cross-pieces being spaced to form convenient ladder rungs for ascending the boom.

12. A unit according to claim 11 in which each truss structure includes a longitudinal tension member substantially in the plane of said ladder rungs, forming a convenient hand rail for a person ascending the ladder.

13. A unit according to claim 11 in which said beams are interconnected by a series of diagonal braces offset from the plane of the ladder rungs to leave room for the toes of a person ascending the ladder.

14. A unit according to claim 9 in combination with a second cable guide means near the bottom of said boom and a third cable guide means near the top of said boom; said cable running from said first guide means to said second guide means; then along said boom to said third guide means; then around said third guide means and back along said boom to said carriage; said carriage being fastened to the end of said cable.

15. A unit according to claim 14 in combination with means for locking said carriage against movement along said boom; whereby said winch and cable are rendered operative for raising and lowering said boom.

16. A unit according to claim 8 in which said boom has its effective center of gravity above and to the rear of its pivot when in vertical, operative position.

17. A unit according to claim 8 in which said boom is detachably mounted on said frame.

18. A unit according to claim 15 in which said locking means comprises a spring-pressed bolt on said carriage and an apertured plate fixed on said boom and positioned to receive said bolt; said plate having inclined side portions for guiding said bolt onto said plate.

References Cited in the file of this patent
UNITED STATES PATENTS

| | | |
|---|---|---|
| 1,281,179 | Levalley et al. | Oct. 8, 1918 |
| 2,241,275 | Shinn et al. | May 6, 1941 |
| 2,258,918 | Wagner et al. | Oct. 14, 1941 |
| 2,331,559 | McEwen | Oct. 12, 1943 |
| 2,336,965 | Shoemaker | Dec. 14, 1943 |